(12) United States Patent
Bernstein et al.

(10) Patent No.: US 8,089,870 B2
(45) Date of Patent: Jan. 3, 2012

(54) QOE BASED ADMISSION CONTROL

(75) Inventors: Alon S. Bernstein, Sunnyvale, CA (US); Guy C. Fedorkow, Bedford, MA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 12/507,762

(22) Filed: Jul. 22, 2009

(65) Prior Publication Data
US 2011/0019542 A1    Jan. 27, 2011

(51) Int. Cl.
*G01R 31/08* (2006.01)
(52) U.S. Cl. .......................... 370/229; 370/232
(58) Field of Classification Search .......... 370/230–232, 370/252, 395.1, 395.21, 395.43, 360; 709/224, 709/227, 229; 725/93–79
See application file for complete search history.

(56) References Cited

U.S. PATENT DOCUMENTS

| | | | |
|---|---|---|---|
| 5,453,986 A | 9/1995 | Davis et al. | |
| 5,513,183 A | 4/1996 | Kay et al. | |
| 5,761,619 A | 6/1998 | Danne et al. | |
| 5,982,748 A * | 11/1999 | Yin et al. | 370/232 |
| 6,459,681 B1 | 10/2002 | Oliva | |
| 6,728,270 B1 | 4/2004 | Meggers et al. | |
| 6,738,819 B1 * | 5/2004 | Li et al. | 370/230 |
| 6,771,648 B1 | 8/2004 | Kim et al. | |
| 6,778,496 B1 | 8/2004 | Meempat et al. | |
| 6,798,786 B1 | 9/2004 | Lo et al. | |
| 6,823,392 B2 | 11/2004 | Cherkasova et al. | |
| 6,842,463 B1 | 1/2005 | Drwiega et al. | |
| 6,842,618 B2 | 1/2005 | Zhang | |
| 6,856,948 B1 | 2/2005 | Tran | |
| 6,868,080 B1 | 3/2005 | Umansky et al. | |
| 6,868,273 B2 | 3/2005 | Cave | |
| 7,010,329 B2 | 3/2006 | Livet et al. | |
| 7,369,559 B2 | 5/2008 | Garakani et al. | |
| 7,606,154 B1 * | 10/2009 | Lee | 370/232 |
| 2002/0129378 A1 * | 9/2002 | Cloonan et al. | 725/111 |
| 2003/0235209 A1 * | 12/2003 | Garg et al. | 370/468 |
| 2005/0059417 A1 * | 3/2005 | Zhang et al. | 455/515 |
| 2006/0120282 A1 * | 6/2006 | Carlson et al. | 370/229 |

FOREIGN PATENT DOCUMENTS

EP    1322132    6/2003

OTHER PUBLICATIONS

Bobby Vandalore et al.; "AQuaFWiN; Adaptive QoS Framework for Multimedia in Wireless Networks and its Comparison with other QoS Frameworks"; IEEE Conference on Lowell; Oct. 1999 19 pgs.
Prosecution History for U.S. Patent No. 7,369,559; issued May 6, 2008.

* cited by examiner

*Primary Examiner* — Ricky Ngo
*Assistant Examiner* — Phuongchau B Nguyen
(74) *Attorney, Agent, or Firm* — Stolowitz Ford Cowger LLP

(57) ABSTRACT

In one example, a Cable Modem Termination System (CMTS) analyzes received service flow traffic to estimate Quality of Experience (QoE) at the endpoints. An admission control system on the CMTS uses the QoE estimate to determine whether to admit new service flows.

17 Claims, 4 Drawing Sheets

QOE BASED ADMISSION CONTROL

BACKGROUND

Cable operators have widely deployed high-speed data services on cable television systems. These data services allow subscriber-side devices, such as personal computers, to communicate over an ordinary cable TV network Hybrid Fiber Coax (HFC) cable plant. A Cable Modem Termination System (CMTS) connects the cable TV network to a data network, such as the Internet. The Data Over Cable Service Interface Specification (DOCSIS) is one of the cable modem standards used for transferring data over the cable TV network.

The CMTS includes an admission control component that controls whether a new connection can be admitted into the cable network. This admission control component determines current bandwidth utilization by summing pre-computed bandwidth estimates for existing connections and then comparing the current bandwidth utilization to a pre-computed available bandwidth. If the difference between the determined current bandwidth and the available bandwidth exceeds a preset fixed margin, the new connection is admitted.

DESCRIPTION OF EXAMPLE EMBODIMENTS

Overview

In one example, a Cable Modem Termination System (CMTS) analyzes received service flow traffic to estimate Quality of Experience (QoE) at the endpoints. An admission control system on the CMTS uses the QoE estimate to determine whether to admit new service flows.

Description

Figure 1:
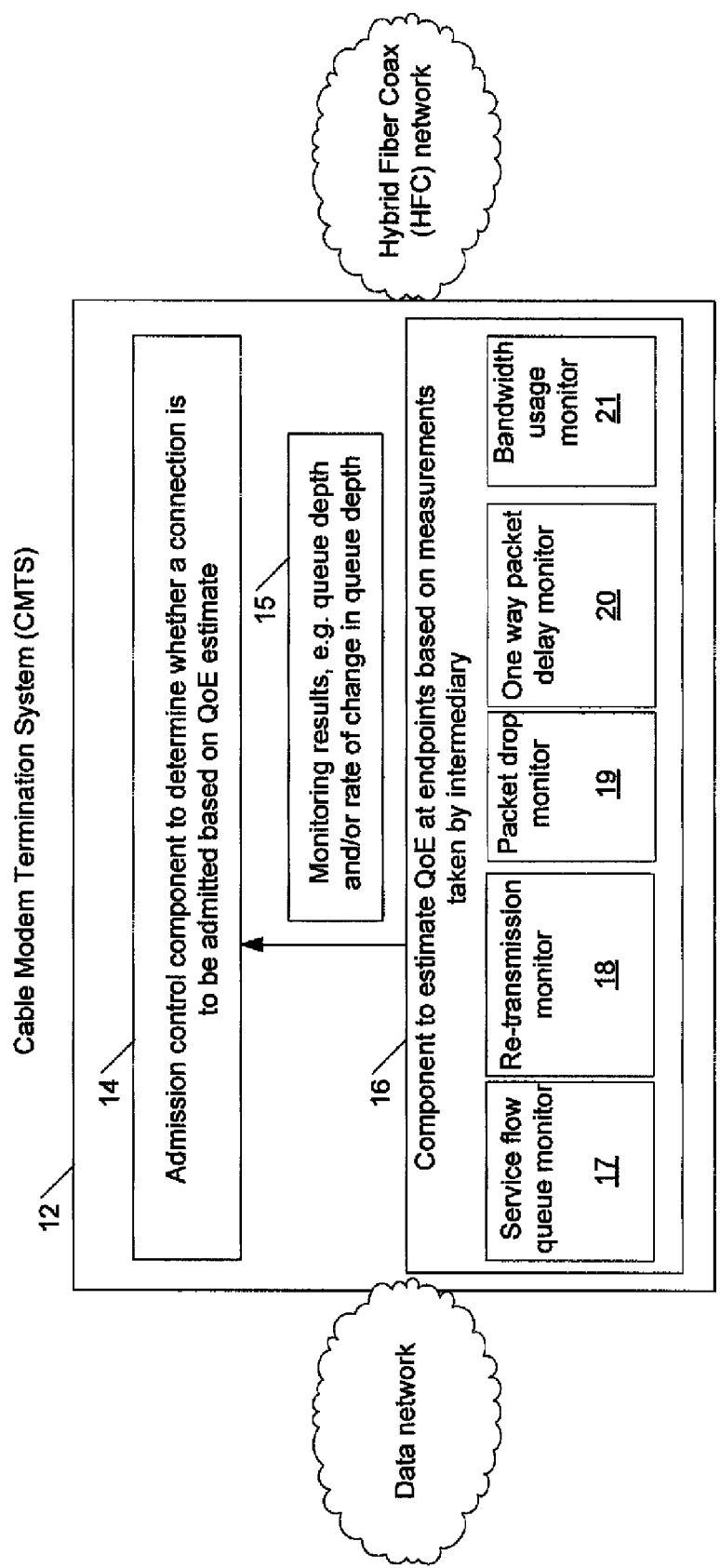
FIG. 1 illustrates a system for admitting connections according to a Quality of Experience (QoE) estimation.

FIG. 1 illustrates a system for admitting connections according to a Quality of Experience (QoE) estimation.

The system 100 includes an admission control component 14 and a QoE estimation component 16 operating on the Cable Modem Termination System (CMTS) 12. The component 16 analyzes packet traffic for existing connections, such as connections extending between the data network and the HFC network and connections extending between devices behind the HFC network, to estimate the QoE at the endpoints associated with the existing connections. The component 16 passes raw measurement data and/or measurement determinations 15 based on the analysis to the admission control component 14 for use in determining whether to admit or deny requests for new connections.

The use of measurement-based data 15 for call admission by the CMTS 12 can be contrasted with the use of pre-computed bandwidth estimates. Whereas pre-computed bandwidth estimates limit the maximum number of calls to a fixed amount, namely total bandwidth over the pre-computed bandwidth value, the system 100 admits as many connections as can be handled without QoE disruptions.

It should also be appreciated that the example CMTS 12 bases call admission control on QoE for users of the call. This is different than basing call admission solely on a comparison between currently utilized bandwidth and total available bandwidth, because users can have a poor quality of experience even when the system has more than a set threshold amount of bandwidth remaining. For example, even before a margin for available bandwidth is met, it is possible for a user to experience delays and other disruptions, which could result in choppy video in the case of a user viewing a video stream.

In one example, the component 16 determines QoE by measuring one or more metrics of packet traffic on the CMTS 12 (such as packet loss or packet delay) and comparing the measurements to a threshold. These thresholds can be set based on an empirical study of how much packet loss or packet delay can be reached before customers, e.g. listeners, viewers, users, etc., become unhappy with the provided service, or set by simply predicting a threshold amount of packet loss or packet delay that is likely to mark significant discernable effects at the endpoints. Accordingly, these packet traffic measurements and thresholds are used to estimate QoE and thus are representative of the user's experience at the endpoint(s). As described throughout, QoE can be estimated using any measurement packet metric of packet traffic on the CMTS 12, not just packet loss and packet delay.

In exemplary embodiments, different packet flow metrics can be used to estimate QoE alone or in combination with a bandwidth comparison such as but not limited to: monitoring service flow queue depth on the CMTS, counting an amount of re-transmissions triggered by a Cisco Visual Quality of Experience (VQE) agent, monitoring packets dropped by the service flow queues on the CMTS, and monitoring one-way packet latency for packets being processed by the CMTS using features of the Cisco Internetwork Operating System (IOS) software associated with Cisco Internet Protocol (IP) Service Level Agreement (SLA) analysis. The QoE estimation component 16 measures these metrics using the service flow queue monitor 17, the re-transmission monitor 18, the packet drop monitor 19, and the one-way packet delay monitor 20. The QoE estimation component 16 uses the bandwidth usage monitor 21 to measure actual bandwidth usage on the RF channels, which can be used for purposes of comparing measured bandwidth load to total available bandwidth to estimate QoE.

In example embodiments, the system 100 can utilize various packet flow metrics to estimate QoE. Any such packet flow metrics may characterize the connections on either a flow-by-flow basis or some other basis that allows QoE to be estimated separately for a first subset of the connections and a second different subset of the connections (see the next paragraph). Also, it should be understood that the CMTS 12 may use only one packet flow metric to estimate QoE, or a combination of the packet flow metrics.

Furthermore, it should be appreciated that, in example embodiments, at least some of the above described packet flow metrics can approximate QoE on a connection-by-connection basis. For example, if poor quality of experience is identified in a subset of the existing connections, for example just one of the existing connections, new connections can be denied even though a system wide approach may indicate that bandwidth should still be available. If a comparison between measured packet load and total bandwidth available is used for estimating QoE, then this comparison can be performed on a per-service group basis or on a per-interface basis (the CMTS 12 can include both narrowband and wideband interfaces) to identify congestion that might be affecting the experience of a subset of users.

It should be understood there can be advantages to utilizing QoE based call admission in addition to pre-computed bandwidth estimates. For example, the system 100 could deny new calls upon detecting either of 1) the difference between the determined current bandwidth (using pre-computed values) and the available bandwidth exceeding a preset fixed margin or 2) packet measurements indicating a QoE disruption.

In an embodiment, a new connection may be accepted in conjunction with altering an existing connection. For example, if a QoE disruption is detected in conjunction with a request for a new connection, the new connection can be admitted by changing any parameter of an existing connection such as disconnecting a random voice call, changing a randomly selected voice call from constant bit rate to best effort, changing a high definition video stream to standard definition, etc. It is also possible to admit the new connection with a modification, for example, admitting a standard definition video stream for the requested content instead of a high definition video stream for the requested content.

The above description discusses measuring packets at an intermediary to detect "QoE disruption" at an endpoint. The term "QoE disruption" as used throughout refers to both immediate disruptions, e.g. the packet analysis indicates that the endpoint is likely currently observing poor QoE, or expected disruptions, e.g. the packet analysis indicates that additional admission into the system 100 will likely result in poor QoE at the endpoint. In either case, a threshold can be used to identify the QoE disruption. For example, if the packet analysis identifies one-way packet delay exceeding a set threshold amount, the packet analysis has detected a QoE disruption.

Although the admission control component 14 and the QoE estimation component 16 are illustrated to be operating locally on the CMTS 12, it should be understood that either or both of these components can be located off box. For example, an external device could monitor packet flow metrics and send the raw measurement data (or determinations based on the raw measurement data) to the CMTS 12. Alternatively, the external device could send the raw data and/or determinations to a policy server through an application manger interface. The CMTS 12 would consult the policy server for approval for each new connection.

Having provided an overview of the benefits of basing call admission on QoE estimates with reference to FIG. 1, reference will now be made to FIGS. 2-4 to describe an example CMTS 22 that bases call admission on monitoring service flow queues on the CMTS 22. This specific example is not intended to limit the principles described herein, thus, it should be understood that other examples can implement the principles described above differently than the example CMTS 22 shown in FIGS. 2-4.

Figure 2:
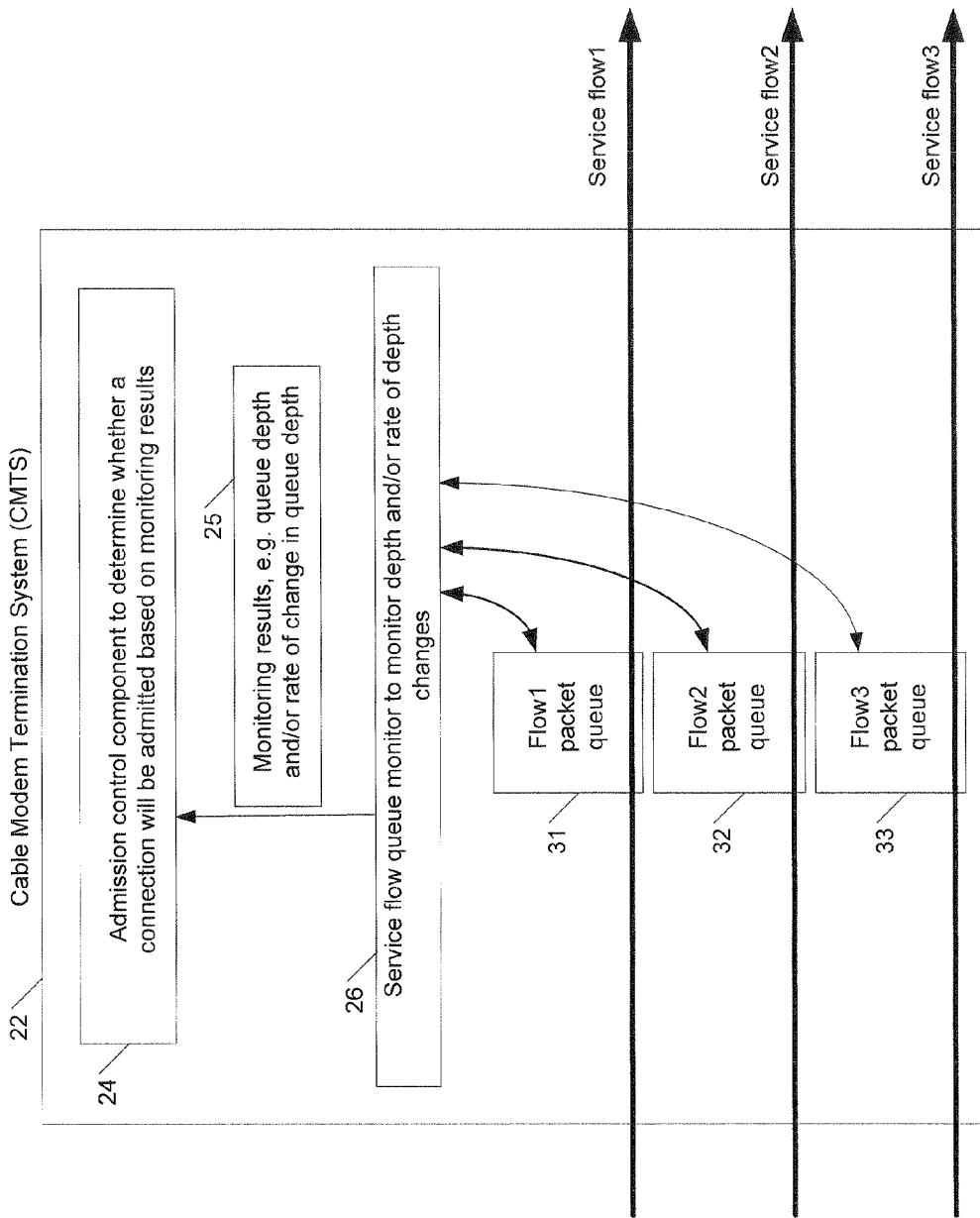
FIG. 2 illustrates one example of a Cable Modem Termination System (CMTS) according to the system shown in FIG. 1.

Before turning to FIG. 2, it should be appreciated that the principles described above can be applied to any network including other oversubscription networks such as passive optical networks and Digital Subscriber Line (DSL) networks. In such other networks, the admission control can be performed at any gateway for the network.

FIG. 2 illustrates one example of a Cable Modem Termination System (CMTS) according to the system shown in FIG. 1.

The CMTS 22 includes a queue monitor 26 to monitor the depth and/or rate of depth changes in the service flow queues 31-33. The queue monitor 26 can monitor the depth and/or rate of depth by inspecting the packets in the queues, or by identifying delays for the service flow and then inferring/calculating queue depth information based on the identified delays (there is a relationship between queue depth and delay, and between the rate that the queue fills and the rate of increase in delay). The admission control component 24 uses monitoring results 25 indicating current queue depths and/or a rate of changes in the queue depths to determine whether to admit or deny a new service flow.

A DOCSIS service flow is defined as a unidirectional flow of packets with a pre-defined Quality of Service (QoS), e.g. rate, bandwidth, etc. These service flows can flow either upstream (from a cable modem to the CMTS 22) or downstream (from the CMTS 22 to a cable modem). The illustrated service flows 1-3 are based on data received over the data network and flow in the downstream direction to the same or different cable modems. These service flows 1-3 can represent video streams, voice streams, etc.

Under DOCSIS, each service flow is assigned a queue on the CMTS 22. It should be understood that these queues may be located on the same physical buffer, but in any case are logically distinct queues. The queues are used to buffer receive traffic to be scheduled for downstream transmission by a scheduler on the CMTS 22. The scheduler arbitrates the release of data from the queues according to factors such as whether the service flow is narrowband or wideband.

The greater the depth of data on a service flow queue, the greater the delay that will be experienced by an endpoint for the corresponding service flow. A video could stutter on the endpoint in instances of large delay (significant queue depth).

Having described the service flow queues 31-33, it should be appreciated that there is one DOCSIS service flow queue per service flow rather than a same receive or transmit buffer pooling traffic from a plurality of logical connections. The example CMTS 22 utilizes this particular feature of DOCSIS to estimate QoE on a flow-by-flow basis.

The component 26 monitors the service flow queues 31-33 as indicated by the curved arrows. The component 26 can monitor instantaneous queue depth and/or a rate of change in the queue depth. The component 26 feeds this information 25 to the admission control component 24. As stated previously, such monitoring of the service flow queues 31-33 can be conducted in any fashion including determining delay and inferring/calculating queue depth information based on a predictable relationship between delay and queue depth.

It is possible for a subset of the service flow queues 31-33 to have a significant queue depth while remaining queues have an insignificant depth due to the underlying Radio Frequency (RF) channel assignments between the service flows. As a result, it should be understood that there could be significant current delay and/or significantly increasing delay on one of the service flows 1-3, but not the others. Accordingly, the monitoring results 25 can indicate delay and/or rate of delay increases on a flow-by-flow basis.

The admission control component 24 analyzes the monitoring results 25 and determines whether to admit or deny newly requested service flows accordingly. One policy is for the component 24 to deny new requests when one of the service flows 1-3 are experiencing delay above a preset threshold, whether the threshold be a set level of queue depth or a set level of change in queue depth over time (queue depth rate). This policy can be particularly useful in some DOCSIS environments because the scheduler (discussed previously) typically operates according to a fair allocation scheme whereby a QoE disruption on one service flow indicates that other service flows will soon be affected. Other policies are for the component 24 to deny new requests when a greater number of the service flows 1-3 are experiencing delay above the preset threshold. Other policies are for the component 24 to deny new requests when mean or median queue depth or rate for all queues, or a subset of queues, is above the preset threshold.

The policies discussed above can utilize a historical approach. For example, the component 24 can deny new requests when one of the service flows experiences a threshold of X instances of delay being above a preset threshold during a set time period T. The other policies discussed above can also utilize a historical approach where the component 24 performs admission based on the rate of QoE disruptions for a given time period T.

The policies discussed above can utilize an averaging approach instead of, or in addition to, the historical approach. For example, the component 24 can deny new requests when one of the service flows experiences an average of N measurements is above a present threshold. The other policies discussed above can also utilize an averaging approach where the component 24 performs admission based on the rate of QoE disruptions for a given time period T. The averaging approach is not limited to mathematically averaging but instead refers to any sort of aggregation of measurements for a service flow where the measurements are taken at different times. The aggregation can be performed by the component 26, or the component 24, or both.

Figure 3:
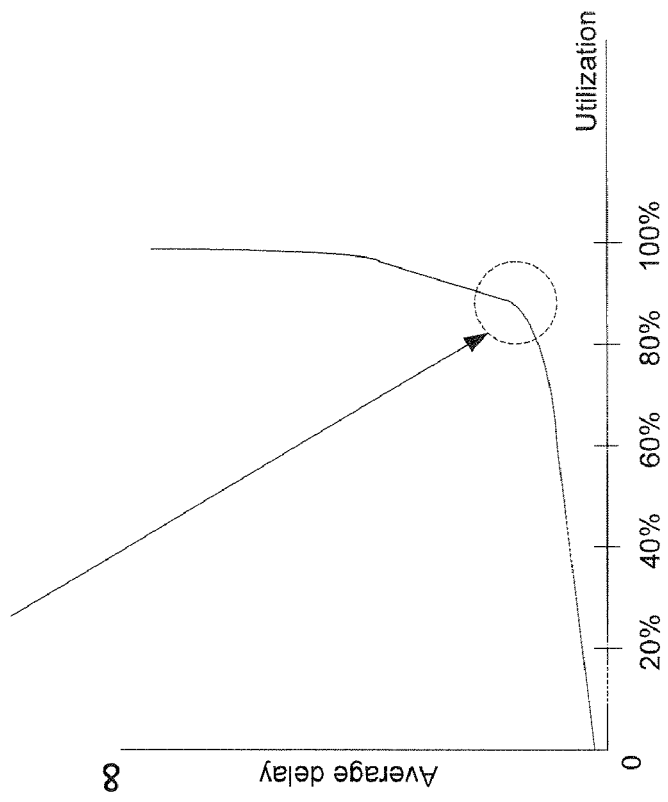
FIG. 3 is a graph illustrating an analysis that can be performed by the CMTS shown in FIG. 2 to determine when to stop admitting connections.

One policy that can be used by the component 24 is illustrated by the graph shown in FIG. 3. Referring to the graph, the x axis indicates aggregate bandwidth utilization, while the y axis indicates average delay for the existing service flows. It has been empirically shown that average delay increases in a roughly linear fashion until a "knee" is reached. The knee is often between 80-90% utilization, but in practice the exact threshold can vary from system to system based on numerous factors. At the knee, average delay starts to increase in a roughly parabolic fashion and average QoE starts to be greatly affected by the new service flows.

It has been empirically discovered that conventional systems using conservative values for admission control can often stop admitting calls before the knee is reached. This essentially wastes resources, because the new service flows could have been admitted without any significant drop in average QoE. In contrast, the component 24 can analyze the monitoring results 25 to determine when an increase in the depth rate indicates that average delay is approaching the knee and continue admitting the new service flows until average delay starts increasing in a non-linear fashion.

Referring back to FIG. 2, it should be noted that any of these policies can utilize classification information to group the flows and then perform admission control according to the groupings. For example, the component 24 could deny additional service flows of a first classification, e.g. video or another first type of media, when a QoE disruption is detected on existing service flows of the first classification, but continue to admit service flows of a second classification, e.g. voice or another second different type of media, as long as existing service flows of the second classification do not have the QoE disruption. In other words, the QoE analysis is performed independently for different subsets of the service flows. The component 24 can obtain the classification information as with any known classification engine, such as by directly or indirectly examining header data including type/class fields and address fields, or even possibly via examining payload data. These classifications can include any classification such as priority classification including DOCSIS demand values assigned to the flows.

The DOCSIS upstream or downstream scheduler (discussed previously) arbitrates data to the queues 1-3 according to hierarchical queuing. In one example, the component 24 identifies groups of service flows for purposes of the QoE analysis on the basis of branches in the hierarchical queuing used by the scheduler operating thereon. In other words, service flows of a same branch are in the same grouping for the group-based QoE analyses so that the same (or similar groups) are used by the component 24 and the scheduler.

Admission or denial by the admission control component 24 can include denying a request for a new service flow, accepting the request without changes to existing service flows, accepting the request with modifications, accepting the request with modifications to one or more existing service flows (e.g. disconnecting a random voice call to find room for a 911 call or changing a randomly selected voice call from constant bit rate to best effort), etc. It should be understood that the admission control for the CMTS 22 is based on service flow queue monitoring results, but not necessarily based solely on service flow queue monitoring results. For example, the component 25 could cross correlate these results 25 with other measured information, such as the other packet flow metrics discussed with respect to FIG. 1, to obtain a cross-correlated estimate of QoE, and then use this cross-correlated QoE estimate for admission control. It may be possible to filter the monitoring results 25, for example delay experienced by a subset of the service flows (those with a low assigned QoS) could be ignored and/or discounted in some way relative to delay experienced by high QoS service flows. In any case, the component 24 controls admission according to the monitoring results 25.

It should also be understood that circuitry configured to execute the functions described herein can operate on any type of CMTS, including but not limited to an Integrated CMTS (I-CMTS) and an Modular (M-CMTS). In the latter example, the circuitry can operate on the core device and/or the edge device (including being distributed across the system formed by the core and edge devices).

It should also be understood that the principles described above are not limited to DOCSIS networks or even cable networks. Any type of router or other network device can be configured to monitor traffic at an intermediary, estimate QoE at the endpoints according to the monitoring at the intermediary, and perform call admission control according to the QoE estimation.

Figure 4:
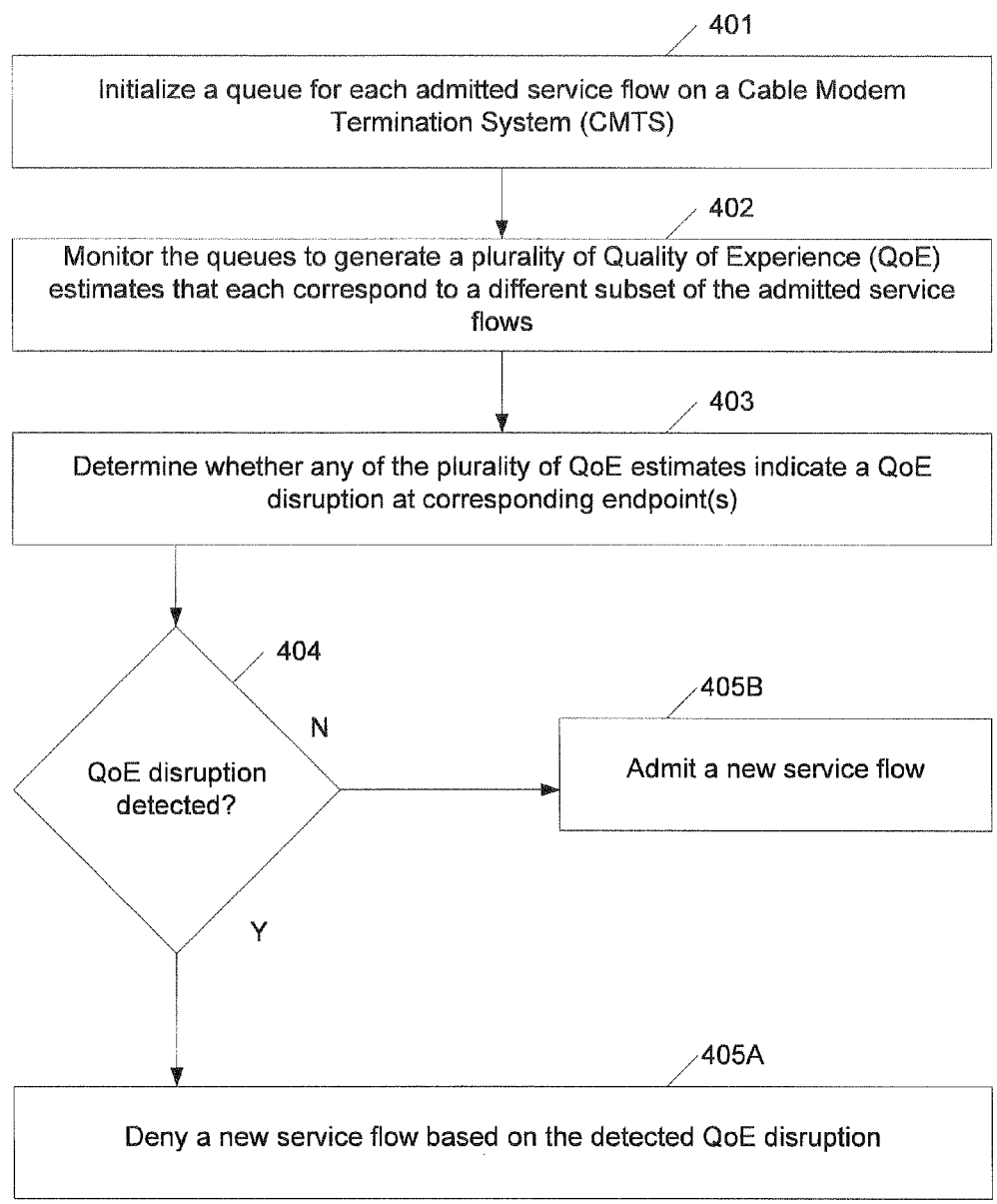
FIG. 4 illustrates how the CMTS shown in FIG. 2 conducts admission control according to QoE estimation.

FIG. 4 illustrates how the CMTS shown in FIG. 2 conducts admission control according to QoE estimation.

In block 401, the CMTS 22 initializes a queue for each admitted service flow on a Cable Modem Termination System (CMTS). These queues are initialized in conjunction with prior admission of these service flows.

In block 402, the CMTS 22 monitors the queues to generate a plurality of Quality of Experience (QoE) estimates that each correspond to a different subset of the admitted service flows. For example, there could be a QoE estimate for each existing service flow. Alternatively, there could be an average (or otherwise representative) QoE estimate for all service flows that represent video streams and an average (or otherwise representative) QoE estimate for all service flows that represent voice calls. Alternatively, there could be a representative QoE estimate for all service flows of a first priority and a representative QoE estimate for all service flows of a second priority.

In block 403, the CMTS 22 determines whether any of the plurality of QoE estimates indicates a QoE disruption at a corresponding endpoint (or corresponding endpoints depending on how many service flows correspond to each subset). If a QoE disruption is detected in diamond 404, then in block 405A the CMTS 22 denies a new service flow based on the detected QoE disruption. Otherwise, in block 405B, the CMTS 22 admits the new service flow.

In the above example, the monitoring can be continuous, with the determination made in response to receiving a request for the new service flow. Alternatively, both the monitoring and the determination could be performed in response to receiving a request for the new service flow. Alternatively, both the monitoring and determining processes could be conducted at times that are selected independently of receiving the request with the result stored in a register that indicates whether a QoE disruption was found. In the latter case, the register setting would remain until the next monitoring and determining process are conducted, and the register would be checked whenever a request is received for a new service flow.

As previously stated, the CMTS 22 is just one of many examples that can be implemented according to the principles described herein and in particular described with reference to FIG. 1. In other examples a CMTS could monitor packet traffic in other ways besides checking queues associated with the service flows, as discussed previously. For example, another CMTS could monitor bandwidth utilization of RF channels of the CMTS to estimate QoE and base admission control on such QoE estimation.

It will be apparent to those having skill in the art that many changes may be made to the details of the above-described embodiments without departing from the underlying principles of the disclosure. The scope of the present disclosure should, therefore, be determined only by the following claims.

Most of the equipment discussed above comprises hardware and associated software. For example, the typical CMTS or other router is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein. The term circuitry used herein can refer to any of the hardware used to execute a program or routine, or to any hardware that can be used to implement the principles described herein independently of software.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

Having described and illustrated some principles herein with respect to the detailed examples above, it should be apparent that the invention may be modified in arrangement and detail without departing from such principles. We claim all modifications and variations coming within the spirit and scope of the following claims.

The invention claimed is:

1. A method, comprising:
 measuring traffic associated with a plurality of service flows processed by a gateway;
 wherein the plurality of service flows includes a first subset and a second different subset, and wherein the traffic measurement approximates Quality of Experience (QoE) separately for the first subset and the second subset;
 analyzing the traffic measurement to detect QoE disruption on a subset-by-subset basis;
 performing admission control on the gateway based on the analysis; and
 denying a new service flow if the traffic measurement indicates that any one of the service flow subsets have a QoE disruption regardless of whether other one or ones of the service flow subsets do not have a QoE disruption according to the traffic measurement.

2. The method of claim 1, wherein the gateway is a Cable Modem Termination System (CMTS).

3. The method of claim 1, further comprising:
 measuring actual bandwidth utilization for the gateway;
 comparing the actual bandwidth utilization measurements to bandwidth capacity; and
 determining whether any of the service flow subsets are indicated as having a QoE disruption based solely on the bandwidth comparison.

4. The method of claim 1, further comprising performing admission control on the gateway independently of pre-computed bandwidth estimates for the plurality of service flows.

5. An apparatus, comprising:
 a memory encoded with instructions for execution by one or more processor; and one or more processors coupled to the memory, the one or more processors being operable when executing the instructions to:
 monitor a plurality of service flows processed by a Cable Modem Termination System (CMTS) to measure traffic for the service flows according to a packet flow metric;
 wherein the plurality of service flows includes a first subset and a second different subset, and wherein the traffic measurement approximates Quality of Experience (QoE) separately for the first subset and the second subset;

analyze the traffic measurement to determine whether any of the service flow subsets are indicated as having a QoE disruption by the traffic measurement; and perform admission control on the CMTS based on the determination;

wherein the circuitry is further configured to deny a new service flow if the traffic measurement indicates that any one of the service flow subsets have a QoE disruption regardless of whether other one or ones of the service flow subsets do not have a QoE disruption according to the traffic measurement.

6. The apparatus of claim 5, wherein the packet flow metric is an actual bandwidth measurement, a service flow queue status, a re-transmission analysis, a packet loss analysis, or a one-way transmission delay analysis.

7. The apparatus of claim 5, wherein the packet flow metric is an actual bandwidth utilization measurement, and the circuitry is further configured to:

measure actual bandwidth utilization of Radio Frequency (RF) channels for the CMTS;

compare the actual bandwidth utilization measurements to bandwidth capacity; and determine whether any of the service flow subsets are indicated as having a QoE disruption based on the bandwidth comparison.

8. The apparatus of claim 5, wherein the circuitry is further configured to admit or deny a new service flow by approving or rejecting a service flow request sent from the CMTS over a packet switched network.

9. The apparatus of claim 5, wherein a new service flow is admitted or denied based on the traffic measurement and independently of pre-computed bandwidth estimates for the monitored service flows.

10. An apparatus, comprising:

a memory encoded with instructions for execution by one or more processor; and one or more processors coupled to the memory, the one or more processors being operable when executing the instructions to:

monitor a plurality of service flows processed by a Cable Modem Termination System (CMTS) to measure traffic for the service flows according to a packet flow metric;

wherein the plurality of service flows includes a first subset and a second different subset, and wherein the traffic measurement approximates Quality of Experience (QoE) separately for the first subset and the second subset;

analyze the traffic measurement to determine whether any of the service flow subsets are indicated as having a QoE disruption by the traffic measurement; and perform admission control on the CMTS based on the determination;

wherein the CMTS maintains a separate service flow queue for each of the monitored service flows, and the circuitry is further configured to:

determine a depth of data on one of the service flow queues at different times;

identify a rate of change in the depth over time according to an analysis of the data depth determinations; and perform admission control on the CMTS based on the identified rate.

11. An apparatus comprising:

a memory encoded with instructions for execution by one or more processors; and one or more processors coupled to the memory, the one or more processors being operable when executing the instructions to:

monitor a plurality of service flows processed by a Cable Modem Termination System (CMTS) to measure traffic for the service flows according to a packet flow metric;

wherein the measurement approximates Quality of Experience (QoE) separately for the different service flows such that QoE disruptions can be identified on a flow-by-flow basis for the plurality of service flows; and analyze the measurements to determine whether any of the service flows have a QoE disruption and perform admission control on the CMTS based on the determination; and wherein the processors are further operable to:

deny a new service flow if the measurements indicate that any one of the monitored service flows have a QoE disruption regardless of whether other ones of the monitored service flows do not have a QoE disruption according to the measurements.

12. An apparatus comprising:

a memory encoded with instructions for execution by one or more processors; and one or more processors coupled to the memory, the one or more processors being operable when executing the instructions to:

monitor a plurality of service flows processed by a Cable Modem Termination System (CMTS) to measure traffic for the service flows according to a packet flow metric;

wherein the measurement approximates Quality of Experience (QoE) separately for the different service flows such that QoE disruptions can be identified on a flow-by-flow basis for the plurality of service flows; and analyze the measurements to determine whether any of the service flows have a QoE disruption and performing admission control on the CMTS based on the determination;

wherein the packet flow metric includes at least one selected from the group including a metric representing the status of each service flow queue for the plurality of service flows, a metric representing an amount of re-transmissions triggered by a Visual Quality of Experience (VQE) agent on a per-service flow basis, a metric representing monitoring packets dropped by a component of the CMTS on a per-service flow basis, and a metric representing one-way packet latency for packets being processed by the CMTS on a per-service flow basis.

13. The apparatus of claim 12, wherein the processors are further operable to:

measure an amount of bandwidth currently used by all service flows of the CMTS; and compare the measured bandwidth to available Radio Frequency (RF) channel bandwidth and performing admission control on the CMTS based on the comparison.

14. The apparatus of claim 13, wherein the processor is configured to admit or deny a new service flow based on the bandwidth measurements and independently of pre-computed bandwidth estimates for the monitored service flows.

15. An apparatus comprising:

a memory encoded with instructions for execution by one or more processors; and one or more processors coupled to the memory, the one or more processors being operable when executing the instructions to:

monitor a plurality of service flows processed by a Cable Modem Termination System (CMTS) to measure traffic for the service flows according to a packet flow metric;

wherein the measurement approximates Quality of Experience (QoE) separately for the different service flows such that QoE disruptions can be identified on a flow-by-flow basis for the plurality of service flows; and analyze the measurements to determine whether any of the service flows have a QoE disruption and performing admission control on the CMTS based on the determination;

wherein said monitoring includes monitoring service flow queues on the CMTS, and wherein the processors are further operable to:

measure a depth of data on one of the service flow queues at different times;

identify a rate of change in the depth over time according to an analysis of the data depth measurements; and perform admission control on the CMTS based on the identified rate.

16. The apparatus of claim 15, wherein there is one service flow queue for each service flow, and wherein the processors are further operable to perform the measuring and identifying for every service flow queue and performing admission control on the CMTS based on the measuring and identifying for every service flow queue.

17. The apparatus of claim 15, wherein the processors are further operable to send the service flow measurements over a packet switched network to the CMTS.

* * * * *